US008438157B2

(12) United States Patent
Adams, Jr.

(10) Patent No.: US 8,438,157 B2
(45) Date of Patent: May 7, 2013

(54) SYSTEM AND METHOD FOR PREVIEWING RELEVANCE OF STREAMING DATA

(75) Inventor: Hugh William Adams, Jr., Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1727 days.

(21) Appl. No.: 10/878,508

(22) Filed: Jun. 28, 2004

(65) Prior Publication Data

US 2005/0289142 A1 Dec. 29, 2005

(51) Int. Cl.
*G06F 17/30* (2006.01)

(52) U.S. Cl.
USPC .......... 707/725; 707/E17.009; 707/913; 715/202

(58) Field of Classification Search ......... 715/200; 707/725, 913
See application file for complete search history.

(56) References Cited

U.S. PATENT DOCUMENTS

| | | | | |
|---|---|---|---|---|
| 5,903,892 | A * | 5/1999 | Hoffert et al. | 707/10 |
| 6,006,241 | A * | 12/1999 | Purnaveja et al. | 715/205 |
| 6,219,837 | B1 | 4/2001 | Yeo et al. | |
| 6,339,437 | B1 * | 1/2002 | Nielsen | 715/787 |
| 6,567,980 | B1 | 5/2003 | Jain et al. | |
| 6,597,859 | B1 | 7/2003 | Leinhart et al. | |
| 7,111,009 | B1 * | 9/2006 | Gupta et al. | 707/102 |
| 2004/0175036 | A1 * | 9/2004 | Graham | 382/173 |
| 2005/0076060 | A1 * | 4/2005 | Finn et al. | 707/104.1 |
| 2005/0271146 | A1 * | 12/2005 | Errico et al. | 375/240.28 |

OTHER PUBLICATIONS

Lin, News Video Classification Using SVM-based Multimodal Classifiers and Combination Strategies, ACM, 2002, p. 323, 326.*
Stephen G. Eick et al., "Seesoft-A Tool for Visualizing Line Oriented Software Statistics", IEEE Transactions on Software Engineering, pp. 957-968; Nov. 1992.
Marti A. Hearst, "TileBras: Visualization of Term Distribution Information in Full Text Information Access", Proceeding of the ACM SIGCHI Conference on Human Factors in Computing Systems (CHI), pp. 59-66, May 1995.

* cited by examiner

*Primary Examiner* — Albert Phillips, III
(74) *Attorney, Agent, or Firm* — Tutunjian & Bitetto, P.C.; Eustus D. Nelson

(57) ABSTRACT

System and methods are provided, which include a presentation device that presents one or more data streams of information to one or more users. Each of the data streams has one or more samples that are arranged a temporal order. A relevancy display has two or more relevance indications, and each of the relevance indications is uniquely associated with one of the samples. The relevance indications are ordered on the relevancy display in the temporal order that corresponds to the order of the samples in the data stream.

18 Claims, 7 Drawing Sheets

Sample MPEG-7 Annotations

```
200 <VideoSegment>
201     <TextAnnotation type="scene description" relevance="1" confidence=".87">
202     <FreeTextAnnotation>
203         Static ScenesNature_Outdoors
204     </FreeTextAnnotation>
205     </TextAnnotation>
206     <MediaTime>
207         <MediaTimePoint>T00:00:09:7277F30000</MediaTimePoint>
208         <MediaIncrDuration timeUnit="PT1N30F"> 504 </MediaIncrDuration>
209     </MediaTime>
210 <VideoSegment>

211 <AudioSegment>
212     <TextAnnotation type="scene description" relevance="1" confidence=".98">
213         <FreeTextAnnotation>
214           Foreground AudioPeople_Oriented:Talking_(One_person)
215         </FreeTextAnnotation>
216         <MediaTime>
217            <MediaTimePoint> T00:00:11:17809F44100 </MediaTimePoint>
218            <MediaIncrDuration timeUnit="PT1N44100F"> 138707 </MediaIncrDuration>
219         </MediaTime>
220 </AudioSegment>
```

FIG. 2
(Prior Art)

SYSTEM AND METHOD FOR PREVIEWING RELEVANCE OF STREAMING DATA

BACKGROUND OF THE INVENTION

1. Field of the Invention

The present invention relates to streaming data, and more specifically, to monitoring, identifying, indexing, presenting, and viewing relevant portions of streaming data.

2. Description of the Related Art

Using graphs to represent the content of text data has provided a quick means of viewing document characteristics. These visual representations can be time saving in determining which documents to examine more thoroughly. An article by Eick called, "SeeSoft-A Tool for visualizing Line Oriented Software Statistics", *IEEE Transactions on Software Engineering*, p 957-968, November, 1992 describes use of a color rectangle or a pixel as a visual indication of changes made in a source file. Each line in a program's source file is represented as a rectangle or pixel. The color of the pixel or rectangle is determined by the length of time since the line was modified. Thus files, which have been recently modified, can be visually identified. In addition the extent of the modifications can also be determined by viewing the graph.

Automatic search of text documents has become common. Search engines display documents satisfying search criteria in a rank ordering. The user then scans the text document to determine how relevant the text is to their query. In a paper by Hearst entitled "Tile Bars: Visualization of Term Distribution Information in Full Text Information Access", *Proceeding of the ACM SIGCHI Conference on Human Factors in Computing Systems(CHI)*, p 59-66, May 1995, describes the use of title bars to indicate search relevance.

Referring to FIG. 1, a title bar 100 is illustrated. The bar 100 is composed of a rectangle 102 whose length corresponds to the length of a document. The text is segmented into either paragraphs or some other granularity. A text box 110 graphically represents each text segment. The shade of a box indicates the number of times a search term occurs in the text segment. Eight shades of gray are typically used, where the darkest is many occurrences of the search term and light is few occurrences of the search term.

There may be several rows 120 of text boxes with each row representing a search term. This permits users to determine when search terms overlap in the document. The row 120 of text boxes 110 for a search term are displayed horizontally across the rectangle. The shade of the text box 110 indicates the number of occurrences the search term was found in the current text segment. If more than one search term is used, additional rows 120 of text boxes 110 are displayed for each search term.

Streaming media can be audio, video, or audio and video. The operative word is streaming. The data is to be viewed sequentially. Future portions of the data may not be available to the client viewer at the time the current portion is being viewed. Future individual video frames could be displayed, but the concept of a frame of audio does not exist. Some portion of the audio must be played in order to determine its content. U.S. Pat. No. 6,597,859 to Leinhart describes dividing a video stream into shots, segment based scene changes, and writing an abstract for each of the shots. U.S. Pat. No. 6,219,837 to Yeo provides summary frames on the bottom of a playing video, to summarize what has previously occurred in the video. This enables someone just beginning to watch the video to understand what previously occurred in the current program. U.S. Pat. No. 6,463,444 to Jain proposes a metadata file to index and retrieve encoded video.

MPEG-7 standard is an implementation of a metadata mechanism for annotating streaming media contents and the time ranges of when the annotations occur. The MPEG-7 file is an XML file, which can be used with the associated media file to position to an object or event. Streaming data can be manually or automatically annotated with the results saved in an MPEG-7 file.

Referring to FIG. 2, samples of MPEG-7 annotations of audio and video segments within a streaming data file are illustratively shown. The key components for searching stream data files are the FreeTextAnnotation node which contains the event description, the TextAnnotation node that contains the confidence level that the description is present, and the MediaTimeNode which is the starting time point and the duration for this description.

FIG. 2 is an example of a portion of an MPEG-7 data file demonstrating a video annotation, lines 200 through 210, and an audio annotation, lines 211 through 220. The data type of the annotation is described in lines 200 video and 211 audio. The confidence level of the annotation is contained in lines 201 and 212. The annotation's description is contained on lines 203 and 214. The time when the annotation occurs within the streaming data is contained in lines 206 through 209 for the video annotation and lines 216 through 219 for the audio annotation. Lines 207 and 217 identify when the annotation starts. Lines 208 and 218 indicate the duration of the annotation.

U.S. Pat. No. 6,567,980 to Jain describes a metadata video catalog with hyperlinks to a mechanism to display frames. A specific implementation of Jain's method would be to search MPEG-7 files for terms similar to text documents are searched today. Thus, a user will be presented with a list of streaming data files, which satisfied his search criteria. The user could then request the playing of these files.

The prior art does not provide for the scanning of the relevance of search terms into the future for streaming data. Postage stamp images can be displayed showing past shots since they can be captured at the time of display. However, displaying future shots can only be done using two streams of video data. The first stream would be the primary display. The second would be used for sample images of future shots. One difficulty with this method is that video streams require considerable bandwidth for transmission and the real time decoding of compressed the video taxes processor resources. Doing twice the work is not practical. In addition, displaying future frames does not handle the problem of display audio relevance to the search terms.

The prior art permits repositioning in text by clicking some user interface object to either move to the next page or the next occurrence of the search term. The common method of repositioning in audio/video is moving a sliding control to indicate where play should commence within the media. Another method is clicking on a shot frame, if present, and repositioning to that shot in the video stream. One disadvantage of this includes that the temporal granularity is very course.

SUMMARY OF THE INVENTION

Systems and methods are provided, which include a presentation device that presents one or more data streams of information to one or more users. Each of the data streams has one or more samples that are arranged in a temporal order. A relevancy display has two or more relevance indications, and each of the relevance indications is uniquely associated with one of the samples. The relevance indications are ordered on the relevancy display in the temporal order that corresponds to the order of the samples in the data stream.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein:

FIG. 2 is an example of a prior art portion of an MPEG-7 data file demonstrating a video and an audio annotation;

DETAILED DESCRIPTION OF PREFERRED EMBODIMENTS

The present invention provides an improved system and method for monitoring, identifying, indexing, presenting, and viewing relevant portions of streaming data. One aspect of the present invention includes determining location and length of relevant portions of streaming data. The streaming data may be determined, for example, along with degree of relevance for relevant portions related to a subject or query.

The present invention presents relevance information to a user by including a presentation device that presents one or more data streams of information to one or more users. Each of the data streams has one or more samples that are arranged in temporal order. The system also includes a relevancy display that has two or more relevance indications. Each of the relevance indications is uniquely associated with one of the samples. The relevance indications are ordered on the relevancy display in the temporal order that corresponds to the order of the samples in the data stream. Other embodiments and features will be described in greater detail below.

It should be understood that the elements shown in the FIGS. may be implemented in various forms of hardware, software or combinations thereof. Preferably, these elements are implemented in a combination of hardware and software on one or more appropriately programmed general-purpose digital computers having a processor and memory and input/output interfaces. Moreover, in an embodiment, the present principles may be implemented in a program storage device readable by machine, tangibly embodying a program of instructions executable by the machine to perform method steps for providing relevancy information for a data stream.

Figure 1:
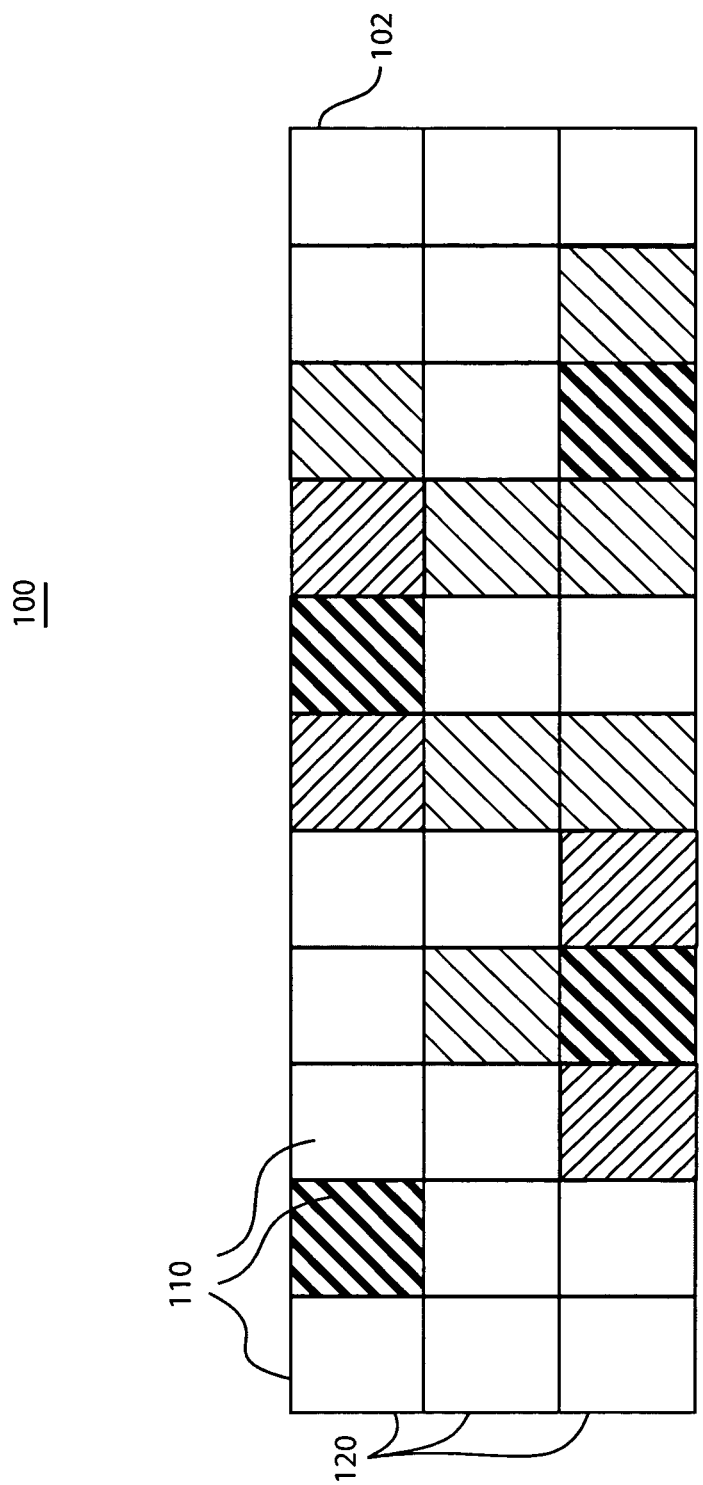
FIG. 1 is an example of a prior art text title bar.
Figure 3:
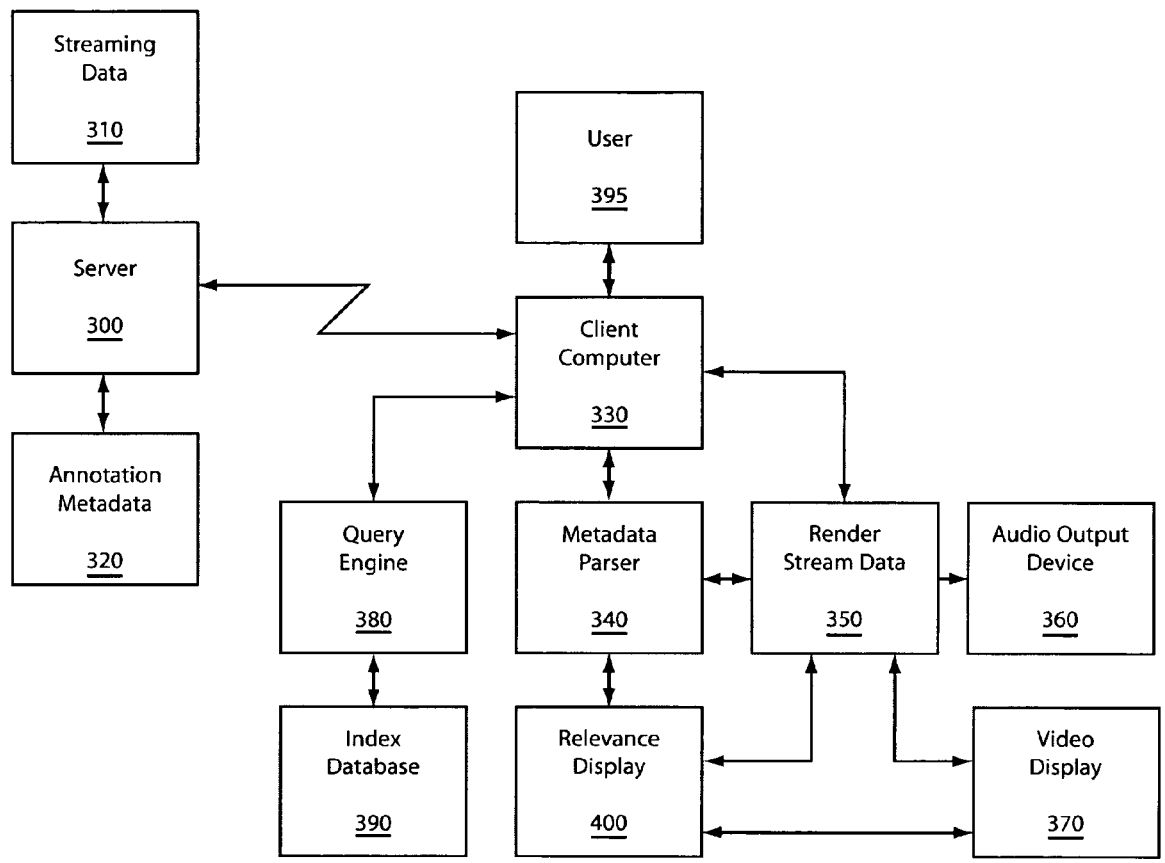
FIG. 3 is a block/flow diagram of one embodiment of a system/method in accordance with the present invention.

Referring now to the drawings in which like numerals represent the same or similar elements and initially to FIG. 3, a block/flow diagram of one preferred embodiment of the present invention is illustratively shown. A user 395 presents a query to the client computer 330. This query is then submitted to a query engine 380, which searches an index database 390 for possible streaming data files 310 that match the query. The index database 390 includes a list of streaming data sources 310 and annotations of important contents included in the annotations. The query engine 380 selects one or more streaming data files 310 that include the search criteria.

Files 310 may include one or more data streams, each of the data streams having one or more samples. The samples preferably have some form of temporal order or relationship to one another. The data stream may include any type of data and any type of content. In particularly useful embodiments, the data stream includes at least one of medical information, abnormal patterns of data, news information, current events, surveillance videos or any other video/acoustic content.

The query engine 380 then makes a request to the client computer 330 to stream the data from a server 300 to the client computer 330. The server 300 and the client computer 330 may be the same machine. In addition, there could be several servers 300 which maybe requested to send streaming data to the client computer 330. The server 300 then sends the streaming data 310 and metadata 320 associated with that stream data 310 to the client computer 330.

The client computer 330 sends the streaming data to render stream data 350. The render stream data 350 transforms the data for output to an audio device 360 and/or a video display 370, respectively for audio or video data.

The metadata 320 received by the client computer 330 is passed to a metadata parser 340. The metadata parser 340 searches the metadata for entries, which match the user's 395 search terms. The metadata parser 340 communicates the time stamp of the metadata 320 entries that match the search criteria and their relevance levels to a relevance display 400.

The relevance display 400 monitors the time of the playing of the rendered stream data 350 and updates the display of relevance levels on the video display 370. The relevance display 400 displays relevance from a current time in the data stream to some parameter settable end range time. In case of a displaying the relevance of the entire stream file in a single display, the relevance display 400 updates a marker to the relevance display to reflect the current position in the render stream data 350.

The following example of the flow through the process of making a query to the eventual playback of stream data fulfilling the request will now be presented. The user 395 makes a query for a video, for example, with a particular newsperson speaking about the campaign finance reform. The client computer 330 passes the query to the query engine 380. The query engine 380 searches the index database 390 for streaming data files, which include the newsperson. The engine 380 then searches these entries for the topic of campaign finance reform.

The query engine 380 ranks the search results using a function based upon confidence of satisfying the query. The query engine 380 reports the confidence and rank results to the client computer 330, which then requests a streaming file 310 to be played from a server 300 starting at a given point in the stream data file 310. The server 300 sends stream data 310 to the client computer 330. The server 300 also sends the annotation metadata 320 associated with the stream data file 310.

Upon receipt of the stream data 310, the client computer sends the stream data to the render stream data process 350 to decode the data and display it on a video display 370 and an audio output device 360. In addition, the client computer 330 sends the annotation metadata 320 to the metadata parser 340. The metadata 320 includes information where the newsperson occurs in the data stream 310 and the topic being discussed. The metadata parser 340 provides the relevance display 400 with the positions where the search criteria, the name of the newsperson and campaign finance reform, have been matched and the relevance values for these positions.

The relevance display 400 queries the current position of stream data 310 that are being rendered from render stream data 350. Render stream data 350 formats the relevance display 400 starting at the current render position using the relevance values it obtained from the metadata parser 340 and the current render position. Render stream data 350 then formats the future relevance display using a future, not rendered position and the relevance data for this future position. Render stream data 350 continues to increase the future data position and display its relevance until the end of a relevance bar is reached. The relevance bar will be described in greater detail below with respect to FIGS. 5, 6 and 7. If the future stream data position is beyond the end of the stream data file 310, a "0" relevance value, for example, is displayed.

The user 395 can observe the rendered output. In addition, the user notes the values shown in the relevance bar. If the bar indicates that no immediate future data pertains to the present query, a request can be made for playing of another stream data file that satisfies the query.

The present invention may be employed in conjunction with many applications. For example, a relevance bar or other indicator may be employed with the display of a browser which searches and displays multimedia data. If the browser uses provides a search result, a relevance bar may be employed in accordance with the present invention to indicate the relevance of future data in the stream.

Figure 4:
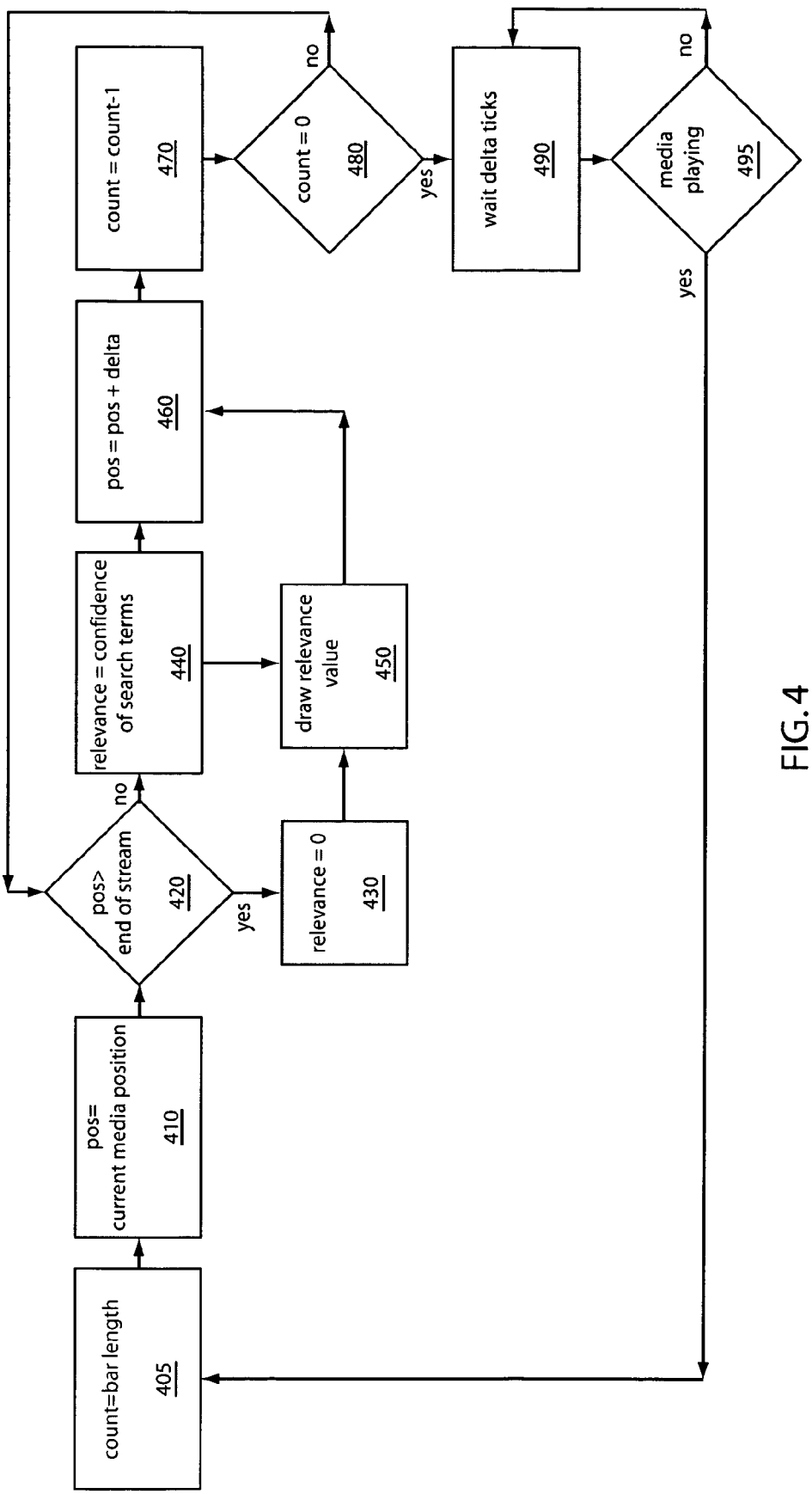
FIG. 4 is a block/flow diagram of a relevance display process for one embodiment of a system/method in accordance with the present invention.

Referring to FIG. 4, a block/flow diagram illustratively shows a relevance display process as provided in block 400 of FIG. 3. A count of a number of entries in a display bar is initialized to the number of entries in the bar in block 405. Next, in block 410, a position (pos) being tested for relevance is initialized to the position currently being rendered (see block 350, 420). If pos is past the end of the stream data (outside a time interval in the stream) in block 310 (FIG. 3), a relevance of "0" is displayed in block 430. Otherwise, if pos is within a time interval of the stream data for block 310 (FIG. 3), the relevance of the current position is calculated using a function to fuse the confidence levels of search terms being present 440. The function for combining confidence levels may include any function that receives information about a topic and compares the information's relevance to the query or concept in question.

In alternative embodiments, the confidence level can be a representation of an order on a hit list of a search engine (audio and/or video), a relevance score returned by a search engine, a degree of match with pre-annotated metadata 320, a degree of match with an MPEG standard annotation (e.g., 201, 212), and/or or any combination of the foregoing process ("fused") by a mathematical function, e.g., a "Support Vector Machine", which is known in the art.

Figure 5:
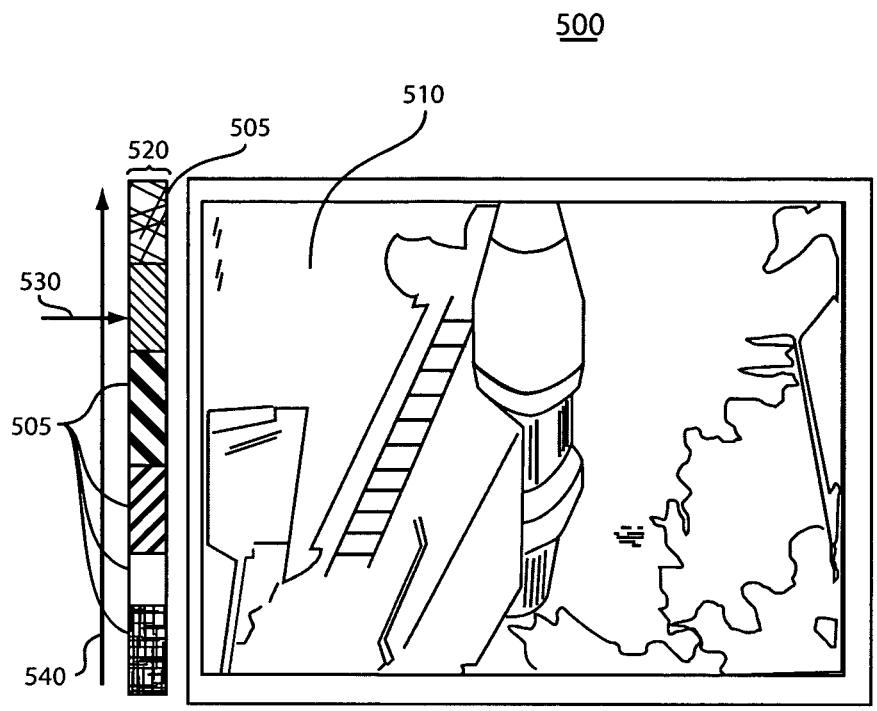
FIG. 5 is an example of a relevance display for locations in the streaming data using color intensity in accordance with the present invention.
Figure 6:
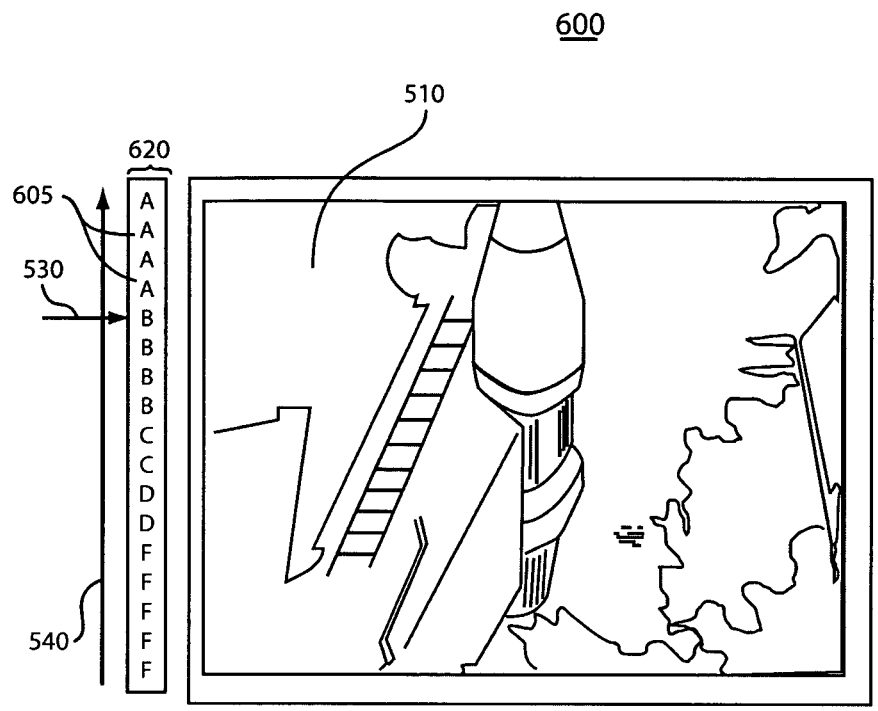
FIG. 6 is an example of a relevance display for locations in the streaming data using a grading scheme in accordance with the present invention.
Figure 7:
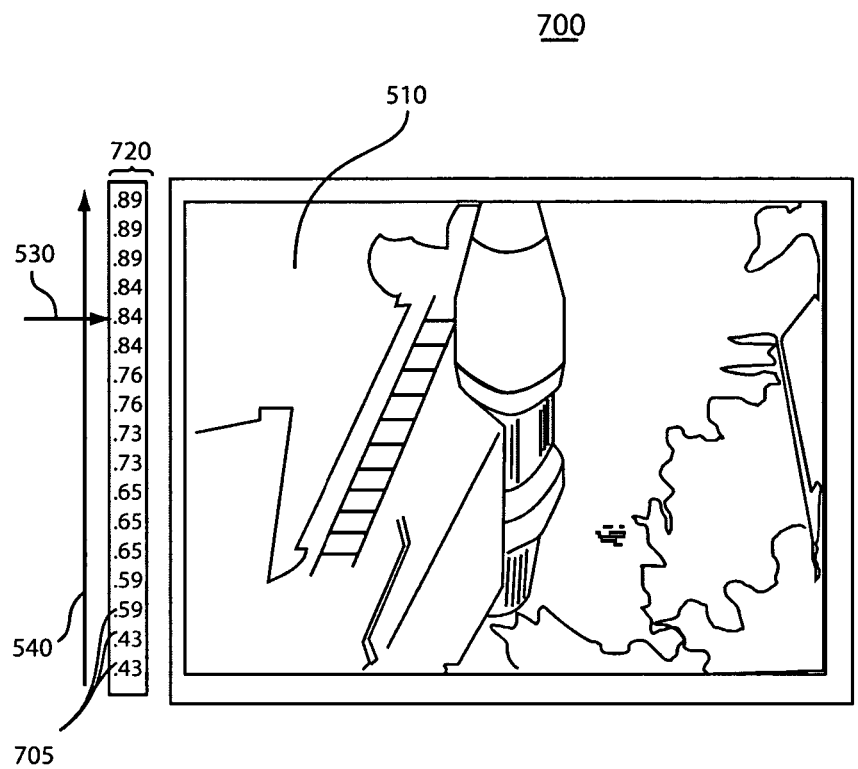
FIG. 7 is an example of a relevance display for locations in the streaming data using numeric values to indicate relevance in accordance with the present invention.

In block 450, the relevance value is then displayed graphically in a relevance bar. The relevance bar may take many forms. FIGS. 5, 6 and 7 are examples of possible relevance bars. Next, in block 460, a parameter delta (increment) is added to pos to change the position in the stream data at which a next value of relevance is determined. This value is then displayed on the rendering of the data stream in block 350 (FIG. 3). The count of number of relevance entries to be displayed is decremented in block 470, and the count is tested as being 0 in block 480. If count is not 0, pos is then tested in block 420 for being within the stream data. If count is 0, the process waits for the parameter delta, the time interval between relevance display entries (delta ticks), in block 490.

If the media is not playing in block 495, the relevance display does not need to be updated, thus the process waits in block 490. If the media is playing, count is initialized to the bar length 405 and the relevance display bar is redrawn.

Therefore, in one preferred embodiment, as the video stream is rendered in time, the relevance display 400 moves so that the current and future relevance indications are displayed along with the stream. In alternative embodiments, the relevance bar (e.g., 500 in FIG. 5) represents a portion or the entire data stream and includes two or more relevance indications (e.g., 505 in FIG. 5) for each respective part of the data stream. These relevance indications 505 are placed in a placement order 540 that is related to temporal position (pos, see FIG. 4) of the respective part in the data stream. In one preferred embodiment, a temporal indicator 530 is used to show which relevance indications 505 is associated with the respective part of the data stream.

Referring to FIG. 5, an example of a system output showing degree of relevance and locations of relevant portions in the streaming data using color intensity is illustratively shown. Color is illustratively shown in gray scale, but color, gray scale, textures or other graphic indicators may be employed as well. A relevance bar 520, graphically displays the relevance of the current data stream. The top of the bar 530 is the relevance of the current position in the rendered data stream (350, FIG. 3) as displayed in a window 510. Traversing the bar downward (against arrow 540), the relevance of future events in the data stream is displayed. In this example, the higher intensity in the color bar 520 indicates higher relevance of stream data. Portions 505 are the relevance for a portion of the data. Arrow 540 indicates the scroll direction of the relevance bar 520 as the stream is played.

Referring to FIG. 6, an example system output showing degree of relevance and locations of relevant portions in the streaming data using grades is illustratively shown. The relevance bar 620, displays the relevance of the current data stream using the letters "A" through "F". The relevance bar 620, graphically displays the relevance of the current data stream. The top of the bar (as indicated by arrow 530) is the relevance of the current position in the rendered data stream (350, FIG. 3) as displayed in the window 510. Traversing the bar 620 downward, the relevance of future events in the data stream is displayed. In this example, the higher letter grade in the bar 620 indicates higher relevance of stream data. Portions, symbols or letters 605 show the relevance grade for a portion of the data. Arrow 540 indicates the scroll direction of the relevance bar 620 as the stream is played.

Referring to FIG. 7, an example system output showing degree of relevance and locations of relevant portions in the streaming data using numeric values is illustratively shown. A relevance bar 720, displays the relevance of the current data stream using numeric values between 0.00 and 1.00. A current position of the stream is indicated at position 530, which is the relevance of the current position in the rendered data stream (350, FIG. 3) as displayed in the window 510. Traversing the bar 720 downward, the relevance of future events in the data stream is displayed. In this example, the greater the numeric value in the bar 720 indicates greater relevance of stream data. Numbers 705 indicate the relevance for a portion of the data. Arrow 540 indicates the scroll direction of the relevance bar 720 as the stream is played.

Note that the features of FIGS. 5, 6 and 7 indicate a display 500, 600 and 700, respectively. Displays 500, 600 and 700 are illustrative user interfaces and should not be construed as limiting the scope of the present invention. The method and manner, which these displays 500, 600 and 700 are configured may take a plurality of different formats and have different features, all within the scope of the present invention. Relevance bars 520, 620 and 720 may be interactive and permit a user to click on a portion thereof to bring up the selected portion of the data stream. Additional functions may include automatically bring up the most relevant portions of the data or delaying the stream a portions of the data which exceed a predetermined threshold. For example, for relevance display 720, a user may wish that a display image be delayed for 15 seconds if the relevance number exceeds 0.85. Other functions and features may be incorporated in the embodiments of the present invention as well and are fully contemplated.

Having described preferred embodiments of a system and method for previewing relevance of streaming data (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method, comprising:
    presenting a query to a computer, the query including search criteria;
    submitting the query to a query engine by the computer;
    searching, by the query engine, an index database of streaming data files, the index database including a list of streaming data sources and annotation metadata, and the streaming data files including samples arranged in a temporal order;
    returning search results by matching the streaming data files with the search criteria;
    ranking the search results based upon a confidence of satisfying the query;
    reporting the ranking and the confidence to the computer;
    receiving the annotation metadata associated with a matching one of the streaming data files in the search results as metadata entries that match the search criteria;
    requesting, by the query engine, to stream the matching one of the streaming data files at a given point;
    rendering the matching one of the streaming data files by decoding the matching one of the streaming data files and displaying the matching one of the streaming data files to the user;
    providing to a relevance display, by a metadata parser, a time stamp of the metadata entries that match the search criteria along with relevance values of the metadata entries that match the search criteria;
    displaying the relevance display;
    querying, by the relevance display, a current position of the streaming data file that is being rendered;
    formatting the relevance display starting at the current position using the relevance values;
    formatting the relevance display using a future, not rendered position and relevance value for the future position; and
    increasing the future position and displaying relevance of the future position until the end of a relevance bar.

2. The method as recited in claim 1, wherein the data stream includes at least one of a video data stream and an audio data stream.

3. The method as recited in claim 1, wherein the relevancy display indicates relevancy of future samples in streaming data prior to their output.

4. The method as recited in claim 1, wherein the relevance display includes the relevancy bar, which indicates the relevancy of current and future samples and further comprising the step of scrolling through relevancy values to display a sample.

5. The method as recited in claim 1, wherein the relevancy bar includes an indicator which shows a relevancy in the bar corresponding to a current sample.

6. The method as recited in claim 1, wherein the relevancy bar includes a scroll bar having at least one of colors, letters or numbers, which indicate the relevance values of each sample.

7. The method as recited in claim 1, wherein the relevance values are derived from data by a mathematical fusion function.

8. A non-transitory program storage device readable by machine, tangibly embodying a program of instructions executable by the machine to perform method steps for providing relevancy information for a data stream, as recited in claim 1.

9. A system, comprising:
    an index database of streaming data files stored in a memory device, said index database including a list of streaming data sources and annotation metadata, and the streaming data files including samples arranged in a temporal order;
    a query engine having a processor for receiving a query that includes search criteria, searching said index database of streaming data files, and returning search results by matching the streaming data files with the search criteria, ranking the search results based upon a confidence of satisfying the query, reporting the ranking and the confidence to a computer, requesting to stream a matching one of the streaming data files in the search results at a given point;
    a metadata parser for receiving the annotation metadata associated with the matching one of the streaming data files as metadata entries that match the search criteria, and providing to a relevance display a time stamp of the metadata entries that match the search criteria along with relevance values of the metadata entries that match the search criteria;
    a rendering device for rendering the matching one of the streaming data files by decoding the matching one of the streaming data files and displaying the matching one of the streaming data files to a user along with the relevance display, the relevance display querying a current position of the matching one of the streaming data files that is being rendered,
    wherein the rendering device formats the relevance display starting at the current position using the relevance values, formats the relevance display using a future, not rendered position and relevance value for the future position, and increases the future position and displaying relevance of the future position until the end of a relevance bar.

10. The system as recited in claim 9, wherein the data stream includes a video data stream and the samples include frames.

11. The system as recited in claim 9, wherein the data stream includes an audio data stream and the sample includes an audio signal.

12. The system as recited in claim 9, wherein the relevancy display indicates relevancy of future samples in streaming data prior to their output.

13. The system as recited in claim 9, wherein the relevance values are derived from one or more metadata about the data stream.

14. The system as recited in claim 9, wherein the relevance display includes the relevancy bar, which indicates the relevancy of current and future samples.

15. The system as recited in claim 9, wherein the relevancy bar includes a scroll bar, which moves in conjunction with displaying of the samples.

16. The system as recited in claim 9, wherein the relevancy bar includes an indicator which shows a relevancy in the bar corresponding to a current sample.

17. The system as recited in claim 9, wherein the relevancy bar includes a scroll bar having at least one of colors, letters or numbers, which indicate relevancy of each sample.

18. The system as recited in claim 9, wherein the relevance values are derived from data by a mathematical fusion function.

\* \* \* \* \*